Nov. 26, 1968 H. OHNSORGE 3,413,600
TRANSMISSION SYSTEM
Filed March 1, 1965 2 Sheets-Sheet 1

INVENTOR
Horst Ohnsorge
BY Spencer & Kaye
ATTORNEYS

INVENTOR
Horst Ohnsorge

BY *Spencer & Kaye*
ATTORNEYS

United States Patent Office 3,413,600
Patented Nov. 26, 1968

3,413,600
TRANSMISSION SYSTEM

Horst Ohnsorge, Ulm (Danube), Germany, assignor to Telefunken Patentverwertungsgesellschaft m.b.H., Ulm (Danube), Germany Filed Mar. 1, 1965, Ser. No. 436,184
Claims priority, application Germany, Feb. 28, 1964, T 25,713
8 Claims. (Cl. 340—146.1)

ABSTRACT OF THE DISCLOSURE

Means for detecting and correcting errors in transmitted data by the coaction of a fault detector and redundancy code wherein the degree of failure can separately be ascertained for each signal received and the errors can be detected and corrected with minimum repetition. Repetition of a received signal is initiated by means provided therefor both when an error which can not be corrected is found and when the number of faults is not less than the number of errors which can be recognized and corrected with certainty.

The present invention relates generally to the data transmission art, and, more particularly, to a method of and an arrangement for data transmission wherein the information-represensting signals are transmitted in the form of individual blocks and the error detection and error correction of the transmitted information is effected by the co-action of a redundancy code and a fault detector.

Fault-time detectors basically only detect faults—e.g. in form of pulse shape distortions or variations of the damping factor of the transmission channel—and not the errors in the transmitted information caused by the faults. If fault-time detectors are used instead of redundancy codes then practically all faults can be detected which lead to errors. On the other hand, as a result of such a sensitive adjustment, a repetition signal is also produced by faults which do not cause an erroneous decision in the data receiver. As a result, a substantial redundancy is caused by the repetition of information blocks which contain the correct information. The increase in the rate of information transmission achieved by the omission of the code redundancy, is again reduced by unnecessary repetitions. Therefore, it is an advantage in many cases, and it is also known, to use fault-time detectors together with a redundancy code to ensure accurate transmission.

With this in mind, it is the main object of the present invention to provide a method of and an apparatus for error detection and error correction of the transmitted information by the co-action of a redundancy code with a fault detector wherein it is possible to ascertain the degree of failure separately for each signal received and to carry out error detection and error correction with the smallest possible redundancy.

Another object is to perform the above object relatively simply.

These objects and others ancillary thereto are accomplished in accordance with preferred embodiments of the invention wherein a repetition of the received information block is initiated when the number of faults indicated by the fault detector to be within one information block is equal to or greater than the number of the errors which can be safely detected or corrected by the redundancy code and/or when an error is indicated by the error-detecting code. If the redundancy code used is a code suited to detect bursts of errors, it has been found to be an advantage to cause the repetition of the received information block if the number of information signals within an information block transmitted from the first up to the last fault is about equal to or greater than the number of information signals in a burst of errors from the first to the last error which can be safely detected or corrected by the redundancy code.

An arrangement which has been found to be particularly advantageous for carrying out the method includes two time-voltage transducers. One time-voltage transducer is switched on from the moment of the arrival of the first fault signal up to the end of the information block. The second transducer is only switched on between each two fault signals or between the last fault signal and the end of the information block. A difference forming stage is provided whose inputs are connected to the outputs of the two transducers. A threshold stage is also used which delivers a repetition signal if the output voltage of the difference forming stage exceeds a certain predetermined value at the end of the block.

Additional objects and advantages of the present invention will become apparent upon consideration of the following description when taken in conjunction with the accompanying drawings in which.

Figure 1:
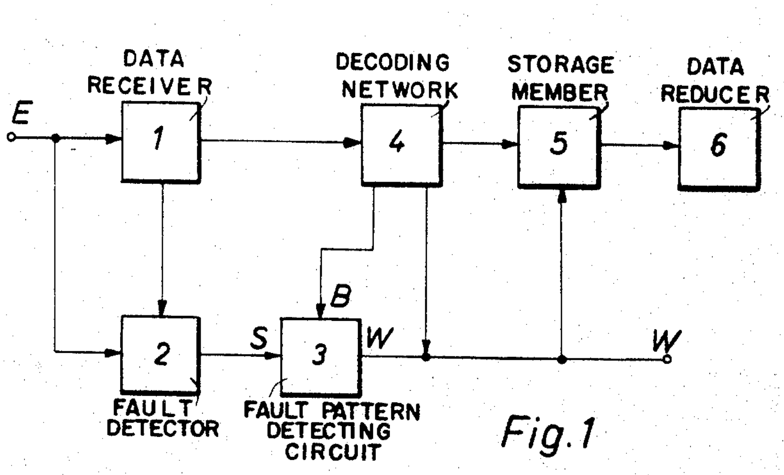
FIGURE 1 is a block diagram of one embodiment of the invention.

With more particular reference to the drawings, FIGURE 1 shows an arrangement in which a signal E is received at the input of a data receiver 1. A code is used for the information. This code is such that when there is any distribution of not more than $n$ errors in the information block, this number of errors can be safely detected and/or corrected. The received signal E is also supplied to a fault detector 2 which is controlled in synchronism with the data receiver 1. This fault detector supplies, at each fault detection, a pulse to the input S of a following circuit 3 for the detection of the fault pattern. As soon as an information block has been received, a decoding network 4 connected to the output of the data receiver 1 issues a block-end signal to the input B of the fault pattern detecting circuit 3. When the above-mentioned code is used, circuit 3 may take the form of a counter. If more than $n$ pulses have been delivered by the fault detector 2 to the circuit 3 during a preceding block, then the circuit 3 forms a repetition instruction W which clears the circuit 3 for the next following information block and clears, at the same time, a storage member 5 which is connected to an output side of the decoding network 4. If the decoding network 4 effects an error recognition, then a repetition instruction is formed by the recognition of an error by the decoding network independently of the fault detector.

Figure 2:
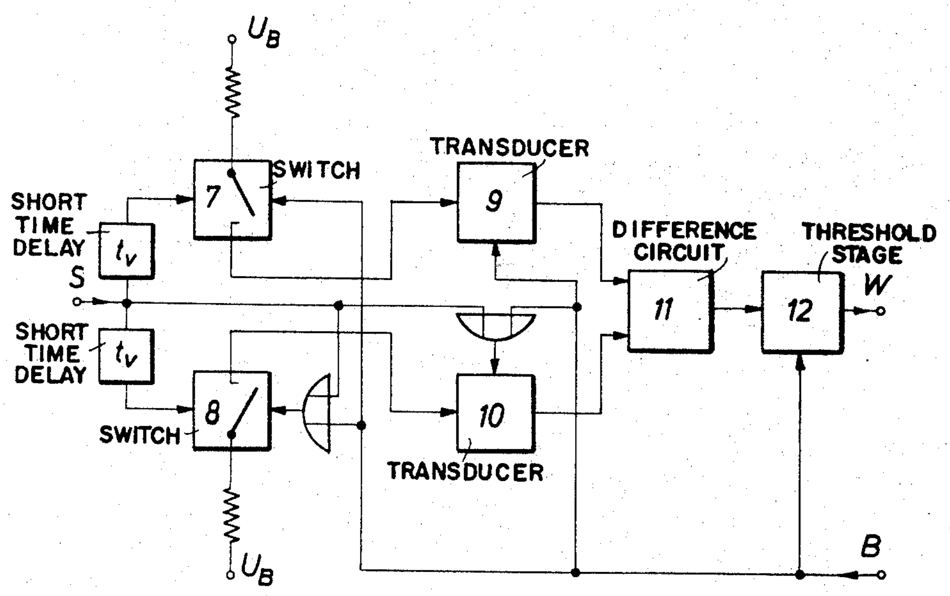
FIGURE 2 is a block diagram of an embodiment of the fault pattern detecting circuit.

Thus, the following cases are possible: In the case of at least $n+1$ fault detections, a repetition instruction is issued by the circuit 3, and such repetition instruction may be issued in addition by the decoding network 4 at the same time. If the error pattern caused by the faults can not be detected by the decoding network, nevertheless, the information block in question is repeated as a result of the repetition instruction issued by the circuit 3, the storage member 5 having been cleared previously by a signal supplied to its input. In the case of less than $n+1$ fault detections, only the decoding network 4 issues the repetition instruction which at the same time clears the storage member 5. If the faults have not caused any errors, then no repetition instruction is issued and the storage member supplies its contents to the data reducer 6. If the decoding network 4 executes an error correction, and if it is capable of correcting safely *n* errors, then the error correction is always effected, but the contents of the storage member are only transferred to the following reducer 6 if, in the information block in question, not more than *n* fault detections have been indicated. Otherwise a repetition instruction and the clearing of the storage contents in question are effected.

Where redundancy codes are used which are capable of assuredly or safely detecting or correcting a succession or burst of errors containing not more than *n* information signals, an arrangement as shown in FIGURE 1 can be used. In this case, however, the circuit 3 can not be realized by means of a simple counter, but a fault pattern detecting circuit is required which may be realized by the arrangement shown in FIGURE 2.

In this arrangement, the circuit 3 for detecting the fault pattern ascertains whether the number of receiver signals, which were received within an information block in the interval between the first and the last fault detection signal, is greater than *n,* the first and the last disturbed receiver signal being included in the count. Only in this case is a repetition instruction issued by the fault pattern detecting circuit 3. In this respect the circuit arrangement shown in FIGURE 2 operates as follows. The first fault detection signal arriving at the input S closes two electronic switches 7 and 8 connected with sources of operating voltage $U_B$ whereby two time-voltage transducers are connected in the circuit. The transducer 9 then issues a voltage which is proportional to the time interval between the first fault signal in the information block and the end of the block, i.e., a voltage which is proportional to the number of received signals which arrive in that interval. The transducer 10, on the other hand, only counts up to the next fault detecting signal, and starts at this moment to count again so that it issues at the end of the block a voltage which is proportional to the time which elapses from the last fault signal in the information block up to the end of the block, i.e., it is proportional to the number of receiver signals received in this period of time. The output voltages of the transducers 9 and 10 are supplied to the inputs of a difference circuit 11 in which the difference of the transducer output voltages is formed. This difference voltage is supplied to a threshold stage 12, the threshold of which is adjusted to a voltage value which is proportional to about $n+\frac{1}{2}$ receiver pulses or proportional to the time in which $n+\frac{1}{2}$ successive pulses can be received. Controlled by the end-of-block signal B, a check is effected at the end of each block to determine whether the voltage appearing at the output of the difference stage 11 exceeds the predetermined threshold value. If this is the case, a repetition instruction is issued. The end-of-block signal B at the same time opens the switches 7 and 8 and restores the transducers 9 and 10 to their initial state. The fault signals delivered by the fault detector arrive at the switches 7 and 8 delayed by the time $t/v$ which is short compared with the interval between two succeeding receiver signals in view of the fact that they have first to bring the transducer 10 into its initial state or to open the switch 8.

The transducer may be realized for instance by analog integrators or by counters with a corresponding resistor matrix, while the difference formation is advantageously effected by means of a difference amplifier.

Figure 3:
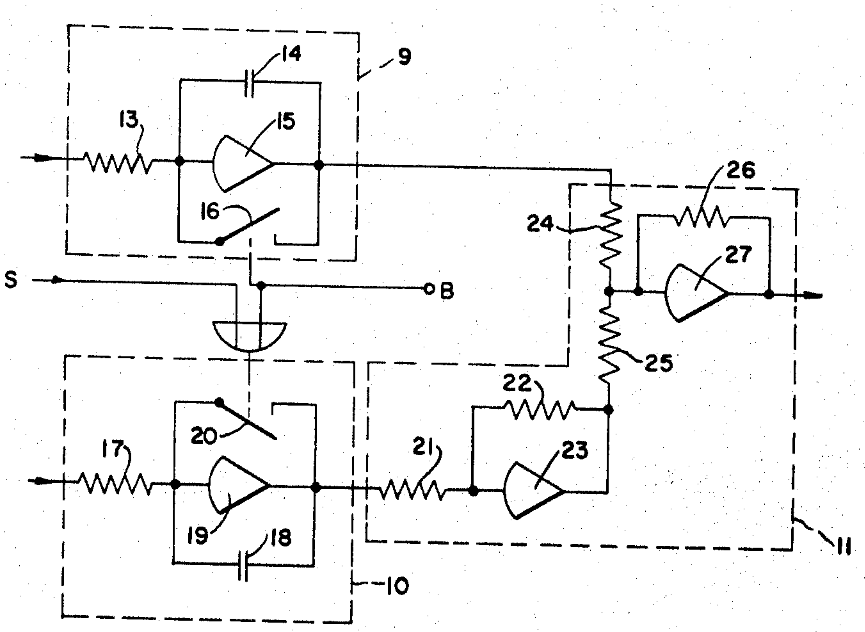
FIGURE 3 is a circuit diagram of the two time-voltage transducers and the difference forming stage.

FIGURE 3 shows a circuit diagram of the time-voltage transducers 9 and 10 and the difference forming stage 11. In this case, both the time-voltage transducers 9 and 10 consist of an operational amplifier 15 and 19, respectively, forming a well known analog integrator by means of a resistor 13 and 17, respectively, and a capacitor 14 and 18, respectively. The output of each operational amplifier is connected to its input by means of an electronic switch 16 and 20, respectively, whereby each amplifier can be restored at the time of the end-of-block signal B. The difference forming stage 11 consists of two further operational amplifiers 23 and 27; the amplifier 23 inverts the output voltage of the transducer 10 by means of the resistors 21 and 22, while the amplifier 27 is forming a summator by means of the resistors 24, 25 and 26.

Figure 4:
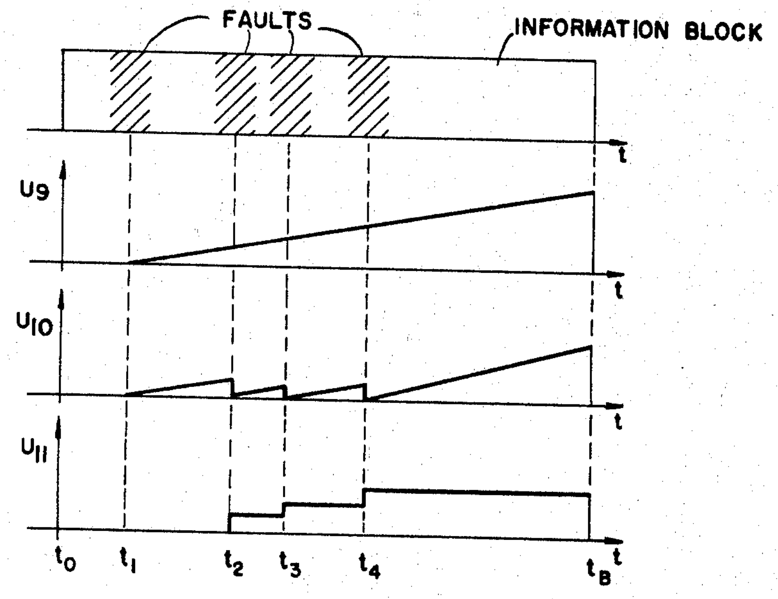
FIGURE 4 is a time chart showing the output voltages of the two time-voltage transducers and the difference forming stage during the receiving of a faulty information block.

FIGURE 4 shows a time chart of the output voltages of the transducers 9 and 10 and the difference stage 11 during the receiving of a faulty information block. The information block has a length of twenty information signals. During the third, the seventh, the ninth and the twelfth information signal a fault detection signal arrives at the input S in FIGURE 2. The first fault detection signal arriving at the time $t_1$ closes the two electronic switches 7 and 8 whereby the two transducers 9 and 10 are connected with the operating voltage $U_B$.

At the time $t_B$—the end of the information block—the output voltage $U_9$ of the transducer 9 is proportional to the time interval $t_B-t_1$. The transducer 10 is restored to its initial state at the time of each fault detecting signal, so that at the time $t_B$ the output voltage $U_{10}$ of the transducer 10 is proportional to the time interval $t_B-t_4$. Therefore, at the time $t_B$ the output voltage $U_{11}$ of the difference forming stage 11 is proportional to the time interval $t_4-t_1$, i.e., it is proportional to the number of information signals, which were received within the information block in the interval between the first and the last fault detection signal.

It will be understood that the above description of the present invention is susceptible to various modifications, changes, and adaptations, and the same are intended to be comprehended within the meaning and range of equivalents of the appended claims.

What is claimed is:

1. In a data transmission arrangement, a receiving station for receiving blocks of information including a redundancy code comprising, in combination:

means for checking errors in the received blocks of information using such redundancy code and for producing a signal which provides for repetition of the received information block when errors are detected; and means for detecting faults in the blocks of information and for producing a signal which provides for repetition of the received information block when the number of faults detected during transmission is greater than the number of errors which can be recognized with certainty by the error checking means.

2. In a data transmission arrangement, a receiving station for receiving blocks of information including a redundancy code comprising, in combination:

means for checking errors in the received blocks of information using such redundancy code and for producing a signal which provides for repetition of the received information block when a greater number of errors are detected than can be corrected; and means for detecting faults in the received blocks of information and for producing a signal which provides for repetition of the received information block when the number of faults detected in such block is greater than the number of errors which can be recognized and corrected with certainty by the error checking means.

3. A receiving station for a data transmission system using a redundancy code, comprising in combination:

a data receiving terminal;

a data receiver connected to said terminal;

a fault detector connected to said terminal;

a decoding network connected to said data receiver for issuing a signal to a first output when an error is detected by code checking and for issuing a signal to a second output at the end of a block of information and having a third output to which the decoded information is fed;

a fault pattern detecting circuit connected to said fault detector and to the second output of said decoding network and issuing a repetition signal to its output when the number of faults detected in a received information block is greater than the number of errors which can be recognized with certainty by the decoding network; and a storage member for receiving by a first input the decoded information from the third output of said decoding network and having a second input connected to the first output of the decoding network and to the output of said fault pattern detecting circuit for clearing the storage member when a repetition signal is given by at least one of (1) said decoding network and (2) said fault pattern detecting circuit.

4. A receiving station for a data transmission system using a redundancy code, comprising in combination:

a data receiving terminal;

a data receiver connected to said terminal;

a fault detector connected to said terminal;

a decoding circuit connected to said data receiver for correcting up to a certain number of errors, for issuing a signal to a first output when an error is detected which can not be corrected, and for issuing a signal to a second output at the end of a block of information, and having a third output to which the decoded information is fed;

a fault pattern detecting circuit connected to said fault detector and to the second output of said decoding circuit and issuing a repetition signal to its output when the number of faults detected in a received information block is greater than the number of errors which can be recognized and corrected with certainty by the decoding circuit; and a storage member for receiving by a first input the decoded information from the third output of said decoding circuit and having a second input connected to the first output of the decoding circuit and to the output of said fault pattern detecting circuit for clearing the storage member when a repetition signal is given by one of said circuits.

5. An arrangement as defined in claim 4 wherein said fault pattern detecting circuit includes two time-voltage transducers one of which is switched on in the interval from the arrival of the first fault signal up to the end of the information block, and the other only being switched on each time, in the interval between two fault signals or between the last fault signal and the end of the information block.

6. A receiving station for a data transmission system using a redundancy code, comprising in combination:

a data receiving terminal;

a data receiver connected to said terminal;

a fault detector connected to said terminal;

a decoding circuit connected to said data receiver for correcting up to a certain number of errors, for issuing a signal to a first output when an error is detected which can not be corrected, and for issuing a signal to a second output at the end of a block of information, and having a third output to which the decoded information is fed;

a fault pattern detecting circuit connected to said fault detector and to the second output of said decoding circuit and issuing a repition signal to its output when the number of information signals within one information block from the first to the last fault is not less than the number of information signals in a burst of errors from the first to the last error which can be recognized and corrected with certainty by the decoding circuit; and a storage member for receiving by a first input the decoded information from the third output of said decoding circuit and having a second input connected to the first output of the decoding circuit and to the output of said fault pattern detecting circuit for clearing the storage member when a repetition signal is given by one of said circuits.

7. An arrangement as defined in claim 6 wherein said fault pattern detecting circuit includes two time-voltage transducers one of which is switched on in the interval from the arrival of the first fault signal up to the end of the information block, and the other only being switched on each time, in the interval between two fault signals or between the last fault signal and the end of the information block.

8. An arrangement as defined in claim 7 wherein said fault pattern detecting circuit further includes a difference forming stage connected to said tranducers, and a threshold stage connected to the difference forming stage which issues a repetition signal when at the end of the block the output voltage of the differnce forming stage exceeds a predetermined value.

References Cited

UNITED STATES PATENTS 3,163,715 12/1964 Kumagai et al. -------- 178—23

MALCOLM A. MORRISON, *Primary Examiner.*

C. ATKINSON, *Assistant Examiner.*